(12) United States Patent
Qin et al.

(10) Patent No.: US 11,825,215 B1
(45) Date of Patent: Nov. 21, 2023

(54) CAMERA MODULE WITH MULTIPLE LENSES USING SINGLE IMAGE SENSOR AND ELECTRONIC DEVICE WITH MODULE

(71) Applicant: TRIPLE WIN TECHNOLOGY (SHENZHEN) CO. LTD., Shenzhen (CN)

(72) Inventors: Chao-Yu Qin, Guangdong (CN); Zhi-Wei Li, Jincheng (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/957,243

(22) Filed: Sep. 30, 2022

(30) Foreign Application Priority Data

Aug. 9, 2022 (CN) .......................... 202210948528.6

(51) Int. Cl.
*H04N 23/52* (2023.01)
*H04N 23/957* (2023.01)

(52) U.S. Cl.
CPC .......... *H04N 23/957* (2023.01); *H04N 23/52* (2023.01)

(58) Field of Classification Search
CPC .... H04N 23/957; H04N 23/52; H04N 13/207; H04N 13/211; H04N 1/00249; G02B 30/24; G02B 23/243
See application file for complete search history.

(56) References Cited

U.S. PATENT DOCUMENTS

| 2010/0208046 | A1* | 8/2010 | Takahashi | .......... | A61B 1/00193 |
| | | | | | 348/E7.085 |
| 2016/0320606 | A1* | 11/2016 | Togino | .................... | G03B 35/10 |
| 2018/0120554 | A1* | 5/2018 | Fukushima | ........ | G02B 23/2415 |
| 2020/0150415 | A1* | 5/2020 | Uchida | ................ | H04N 13/207 |

FOREIGN PATENT DOCUMENTS

CN             113747024        12/2021

* cited by examiner

*Primary Examiner* — Hung H Lam
(74) *Attorney, Agent, or Firm* — ScienBiziP, P.C.

(57) ABSTRACT

A multi-lens camera module making use of a single image sensor comprising first and second lens modules, an image acquisition module, a refracting module, and a shielding module. The refracting module refracts light from either the first lens module and/or the second lens module, the shielding module allowing light to enter only one of the first or second lens modules by masking the other. The first and second lens modules can share one image acquisition module, which saves cost and interior space of the camera module and thus of the electronic device using such camera module. An electronic device comprising the camera module is also provided.

15 Claims, 7 Drawing Sheets

CAMERA MODULE WITH MULTIPLE LENSES USING SINGLE IMAGE SENSOR AND ELECTRONIC DEVICE WITH MODULE

CROSS-REFERENCE TO RELATED APPLICATION

This application claims priority to China Application No. 202210948528.6, having a filing date of Aug. 9, 2022, filed in China State Intellectual Property Administration, the entire contents of which are hereby incorporate by reference.

FIELD

The subject matter relates to imaging and optical devices, and more particularly to a camera module with multiple lenses using a single image senser and an electronic device.

BACKGROUND

Camera module with multiple lenses are more and more popular in the market as customers require more powerful camera systems. Electronic devices such as mobile phones nowadays generally have a dual-lens camera or a triple-lens camera. However, the multiple-lens camera comprises multiple image sensors, which occupy a large space in a mobile phone and also increases the cost of the phone.

SUMMARY

An objective of the present disclosure is achieved by providing a camera module comprising:
- a first lens module and a second lens module disposed adjacent to each other, each of the first lens module and the second lens module comprises a lens for receiving light, each lens comprises an object side and an image side opposite to the object side;
- an image acquisition module aligning with the image side of the lens of the first lens module for converting the light transmitted from the lens;
- a refracting module, the refracting module comprises a refracting component, the refracting component being arranged between the image side of the second lens module and the image acquisition module for refracting the light from the second lens module to the image acquisition module;
- a shielding module, the shielding module allowing light to enter either the first lens module or the second lens module by covering the lens of the other of them.

According to a further aspect, the refracting component is a freeform lens, the freeform lens refracts the light from the lens of the second lens module to the image acquisition module without optical distortion.

According to a further aspect, each lens module includes a first driver for moving and focusing the lens.

According to a further aspect, each of the first lens module and the second lens module includes a second driver with a prism therein, the second driver drives the prism to move for refraction of external light into the lens; the prism comprises a first surface facing external, a second surface facing the object side of the lens, and a third surface configured to reflect incident light to change a path of the incident light to the lens; the shielding module allows light to enter one of the first lens module and the second lens module by covering the prism of the other one of the first lens module and the second lens module.

According to a further aspect, the camera module further comprises a holder, the first lens module and the second lens module are mounted in the holder; the shielding module comprises a third driver mounted on the holder and a shielding component rotatably connected to the holder via the third driver, the third driver is positioned between the first lens module and the second lens module; the shielding component has a first shielding portion, a second shielding portion, and a connecting shaft, wherein the first shielding portion and the second shielding portion are located respectively at two ends of the connecting shaft, the connecting shaft is connected to the third driver at a middle part for pivoting the shielding component, the third driver can pivot the shielding component to cover the prism of the first lens module by the first shielding portion or can cover the prism of the second lens module by the second shielding portion.

According to a further aspect, the camera module further comprises a shell, the shell has a first opening and a second opening opposite to the first opening; the first opening is connecting to the holder at the side near the image side of the lenses of the first lens module and the second lens module, the second opening is connected to the image acquisition module, then the shell defines a cavity for the light path from the first lens module and the light path from the second lens module, to the image acquisition module.

According to a further aspect, the image acquisition module comprises a printed circuit board, a sensor chip, a connector, and an electronic component, wherein the printed circuit board controls the sensor chip; the sensor chip converts incoming light into an electrical signal; the electronic component processes the electrical signal from the sensor chip and the connector is configured for connecting the camera module to other devices.

According to a further aspect, a camera module is provided, comprising: a series of lens modules, each lens module comprises a lens for receiving light, the lens comprises an object side and an image side opposite to the object side; an image acquisition module arranged after the image sides of the lenses of the series of lens modules for converting the light transmitted from the lens; a refracting module, the refracting module comprises a series of refracting components, each refracting component being arranged between the image side of one of the series of lens modules and the image acquisition module for refracting the light from the lens to the image acquisition module; a shielding module, the shielding module allowing light to enter the lens of one lens module of the series by covering the lenses of rest lens modules.

According to a further aspect, the refracting component is a freeform lens, the freeform lens refracts the light from the respective lens to the image acquisition module without optical distortion.

According to a further aspect, the image acquisition module is aligned with one of a series of lens modules, the refracting component for that one of the series of lens modules being removed.

According to a further aspect, each of the series of lens modules includes a first driver for focusing the lens; each of the series of lens modules includes a second driver and a prism received in the second driver, the second driver moves the prism for refracting incoming light into the lens; each prism comprises a first surface facing external, a second surface facing the object side of the lens, and a third surface configured to reflect incident light to change a path of the incident light to the lens; the shielding module allows light to enter the prism of one of the series of lens modules by covering the first surface of the prisms of the other lens modules.

According to a further aspect, the camera module further comprises a holder, the series of lens modules are mounted in the holder and disposed in a row; the shielding module comprises a series of third drivers and shielding components, each shielding component being mounted on the holder near the prism of one lens module, each third driver moving one of the shielding components to cover the prism of the one of the series of lens modules.

According to a further aspect, the camera module further comprises a shell, the shell has a first opening and a second opening opposite to the first opening; the first opening is connecting to the holder at the side near the image side of the lenses of the lens modules, the second opening is connected to the image acquisition module, then the shell defines a cavity for passage of the light from the lens modules to the image acquisition module.

According to a further aspect, the image acquisition module comprises a printed circuit board, a sensor chip, a connector, and an electronic component, wherein the printed circuit board controls the sensor chip; the sensor chip converts the light transmitted from the lens into an electrical signal; the electronic component processes the electrical signal from the sensor chip and the connector connects the camera module to other devices.

According to a further aspect, an electronic device comprising the camera module above-mentioned is provided.

BRIEF DESCRIPTION OF THE DRAWINGS

Implementations of the present technology will now be described, by way of example only, with reference to the attached figures.

DETAILED DESCRIPTION

Figure 1:
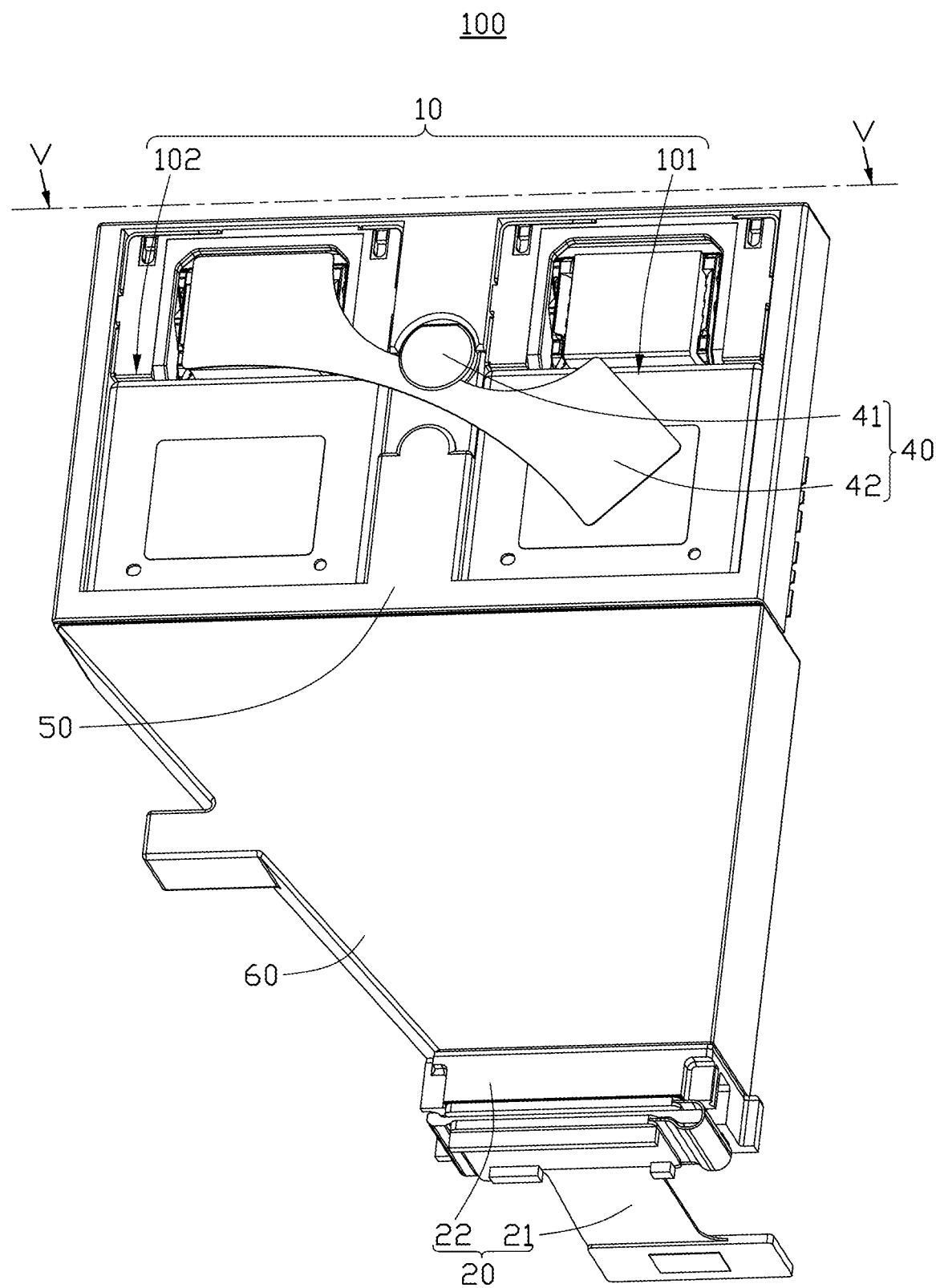
FIG. 1 is a perspective view of a camera module according to a first embodiment of the present disclosure.

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

It should be understood that, the terms "first" and "second" are used to distinguish between elements and are not used to denote a particular order or imply a number of technical features, therefore, unless specifically defined, features described as "first" and "second" may expressly or implicitly include one or more of the stated features. In the description of the present application, "plurality" means "two or more", unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

With reference to the figures, a detailed description of the hereinafter described embodiments of the disclosure is presented herein by way of exemplification and not as limitation.

Embodiment 1

Referring to FIG. 1, a camera module 100 is provided, the camera module 100 can be mounted in a phone, a laptop, or any other device with camera function. Further referring to FIGS. 2-3, the camera module 100 is configured as a dual-lens camera comprising two lens modules 10, an image acquisition module 20, a refracting module 30, and a shielding module 40. The two lens modules 10 are illustrated as a first lens module 101 and a second lens module 102 for convenience of description. The first lens module 101 and the second lens module 102 are disposed adjacent to each other, wherein the first lens module 101 is aligned with the image acquisition module 20, and the second lens module 102 is connected to the refracting module 30 for refracting light to the image acquisition module 20.

Specifically, each of the first lens module 101 and the second lens module 102 includes a lens 12 directing incoming light to the image acquisition module 20, the lens 12 comprises an object side 121 and an image side 122 opposite to the object side 121, the shielding module 40 masks the lens 12 of one lens module 10 to prevent light entering one object side 121 and allow light to enter only another object side 121 of the lens 12.

For example, when the first lens module 101 is required to work, the shielding module 40 covers the lens 12 of the second lens module 102 for allowing the light to enter the lens 12 of the first lens module 101; when the second lens module 102 is required to work, the shielding module 40 covers the lens 12 of the first lens module 101 for allowing the light to enter the lens 12 of the second lens module 102.

Therefore, incoming light through the first lens module 101 arrives at the image acquisition module 20 directly, and incoming light through the second lens module 102 is refracted by the refracting module 30 for arriving at the image acquisition module 20. The image acquisition module 20 is shared by the first lens module 101 and the second lens module 102. The configuration of the camera module 100 reduces the number of the image acquisition modules 20, which saves cost and interior space of the camera module 100.

Figure 3:
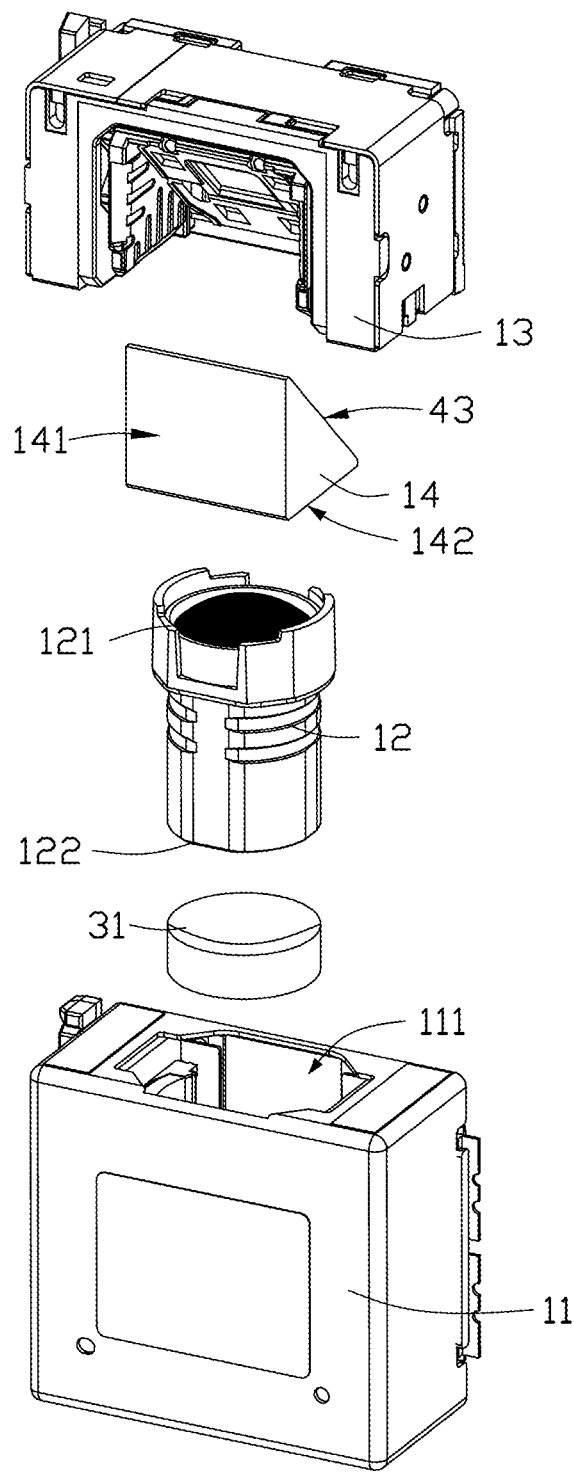
FIG. 3 is an exploded view of a second lens module of the camera module in FIG. 2.

Referring to FIG. 3, the refracting module 30 comprises a freeform lens, the freeform lens refracts the light going through the second lens module 102 to the image acquisition module 20, then the image formed is shifted without the optical parameters of the lens 12 being changed.

Additionally and/or alternatively, each of the first lens module 101 and the second lens module 102 includes a first driver 11 for focusing each of the lenses 12. In this embodiment, the first driver 11 is a voice coil motor carrying the lens 12, the first driver 11 can move the lens 12 from an initial position to a position of focus.

Additionally and/or alternatively, the first driver 11 has a receiving cavity 111 for receiving the lens 12.

Figure 2:
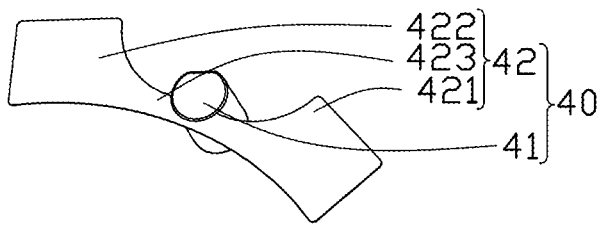
FIG. 2 is an exploded view of the camera module in FIG. 1.
Figure 2:
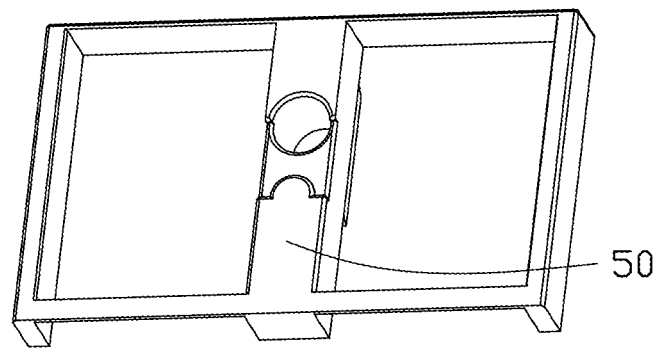
Figure 2:
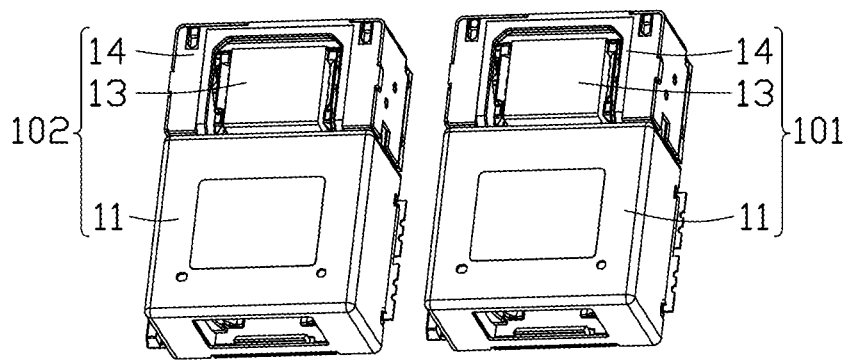
Figure 2:
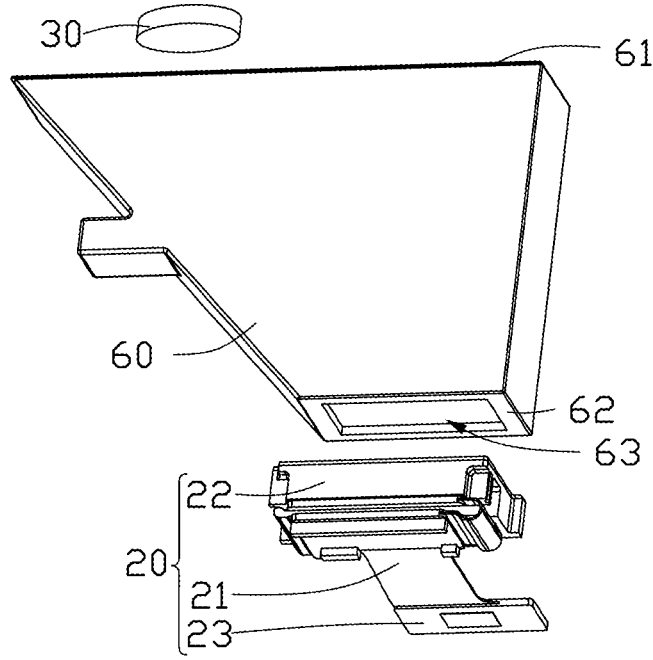

Referring to FIGS. 2-3, additionally and/or alternatively, each of the first lens module 101 and the second lens module 102 further includes a second driver 13 and a prism 14 received in the second driver 13. The second driver 13 can move the prism 14 to refract light into the lens 12. Specifically, the second driver 13 is connected to the first driver 11, the prism 14 is preferably a triple prism comprising a first surface 141 facing external, a second surface 142 facing the object side 121 of the lens 12, and a third surface 143 configured to reflect incident light to change a path of the incident light to the lens 12. The shielding module 40 can cover the first surface 141 of one of the prisms 14 to ensure that light cannot enter the first lens module 101 and the second lens module 102 simultaneously. The second driver 13 is preferably a motor for moving the prism 14, thereby light can enter the prism 14 at different angles.

Figure 4:
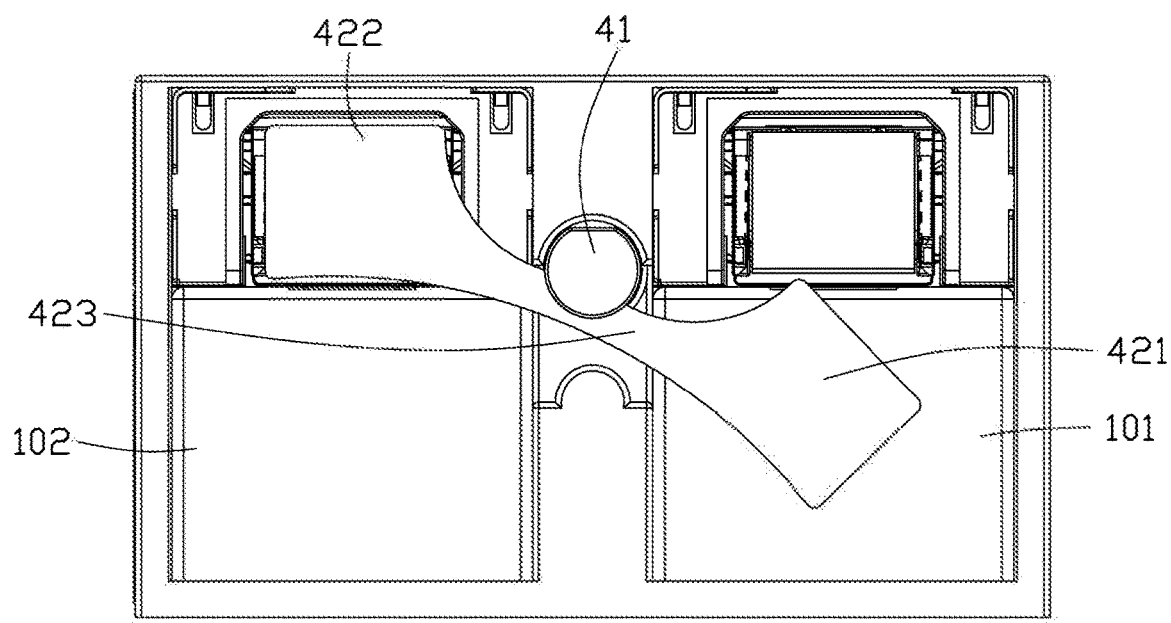
FIG. 4 shows a shielding element of the camera module in FIG. 1 in a first state.
Figure 5:
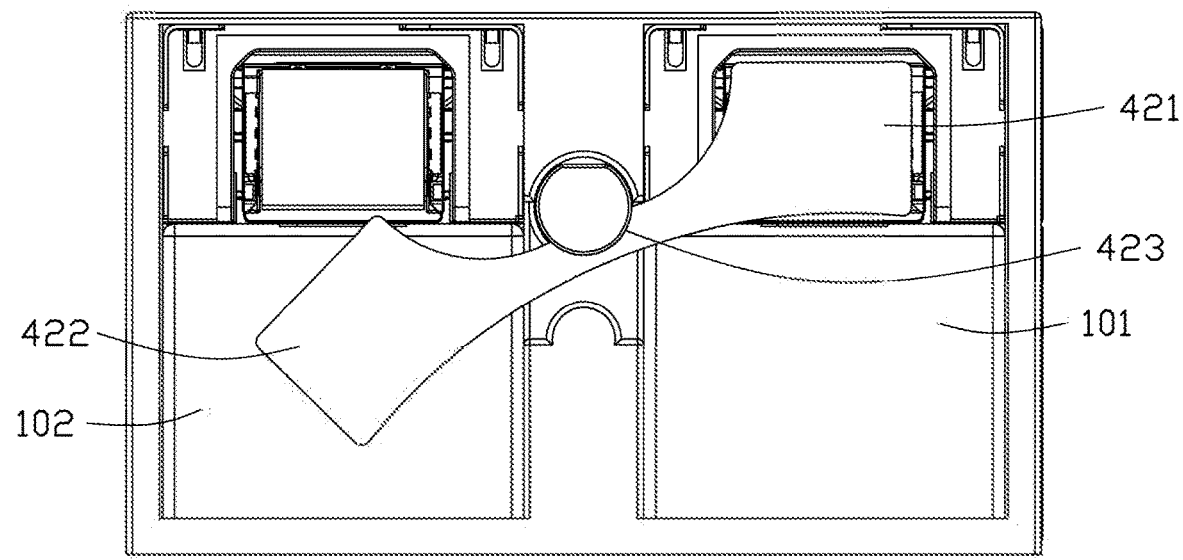
FIG. 5 shows the shielding element of the camera module in FIG. 1 in a second state.

For example, in this embodiment, when the first lens module 101 is required to work, as shown in FIG. 4, the shielding module 40 covers the prism 14 of the second lens module 102, allowing the light to enter the prism 14 of the first lens module 101. The light is refracted by the prism 14 to go through the lens 12 to arrive at the image acquisition module 20; when the second lens module 102 is required to work, as shown in FIG. 5, the shielding module 40 covers the prism 14 of the first lens module 101, allowing the light to enter the prism 14 of the second lens module 102. The light is refracted by the prism 14 into the lens 12 to arrive at the refracting module 30, then the refracting module 30 aims the light onto the image acquisition module 20.

It should be noted that, the configurations of the first lens module 101 and the second lens module 102 need not be the same provided that light going through either one of the lens modules will arrive at the image acquisition module 20. For example, in this embodiment, light going through the first lens module 101 will arrive directly at the image acquisition module 20 while light going through the second lens module 102 will go through the refracting module 30 before arriving at the image acquisition module 20.

Additionally and/or alternatively, referring to FIGS. 1-2, the camera module 100 further includes a holder 50, the first lens module 101 and the second lens module 102 are both mounted in the holder 50, improving the structure stability of the camera module 100.

Additionally and/or alternatively, referring to FIG. 2, the shielding module 40 comprises a third driver 41 mounted on the holder 50 and a shielding component 42 rotatably connected to the holder 50 via the third driver 41. The third driver 41 is positioned between the first lens module 101 and the second lens module 102 and can swing the shielding component 42 to cover either prism 14 of the first lens module 101 or the second lens module 102 directly. Specifically, referring to FIGS. 4-5, the shielding component 42 has a first shielding portion 421, a second shielding portion 422, and a connecting shaft 423. The first shielding portion 421 and the second shielding portion 422 are at the ends of the connecting shaft 423, a middle part of the connecting shaft 423 is connected to the third driver 41 to be pivoted. In operation, the third driver 41 drives the shielding component 42 to pivot a certain angle to cover the prism 14 of the first lens module 101 by the first shielding portion 421 or the prism 14 of the second lens module 102 by the second shielding portion 422.

In this embodiment, the shielding component 42 is a sheet of material substantially resembling dumbbells in shape, the first shielding portion 421 and the second shielding portion 422 are the two enlarged portions of the dumbbells, and the connecting shaft 423 is a longitudinal axis of the dumbbells. It should be noted that, in further embodiments, the shielding component 42 can be in other shapes, as long as the third driver 41 can pivot the first shielding component 42 a certain angle to cover the prism 14 of the first lens module 101 and pivot the shielding component 42 another certain angle to cover the prism 14 of the second lens module 102. For example, the connecting shaft 423 can bend to regulate motion curve of the first shielding portion 421 and the second shielding portion 422 to ensure that the prism 14 of one lens module is exposed when the prism 14 of the other lens module is covered.

Additionally and/or alternatively, each of the first shielding portion 421 and the second shielding portion 422 has an area larger than that of a prism 14 to avoid light leakage.

Additionally and/or alternatively, each of the first shielding portion 421 and the second shielding portion 422 is opaque and black to improve the shielding effect.

Figure 6:
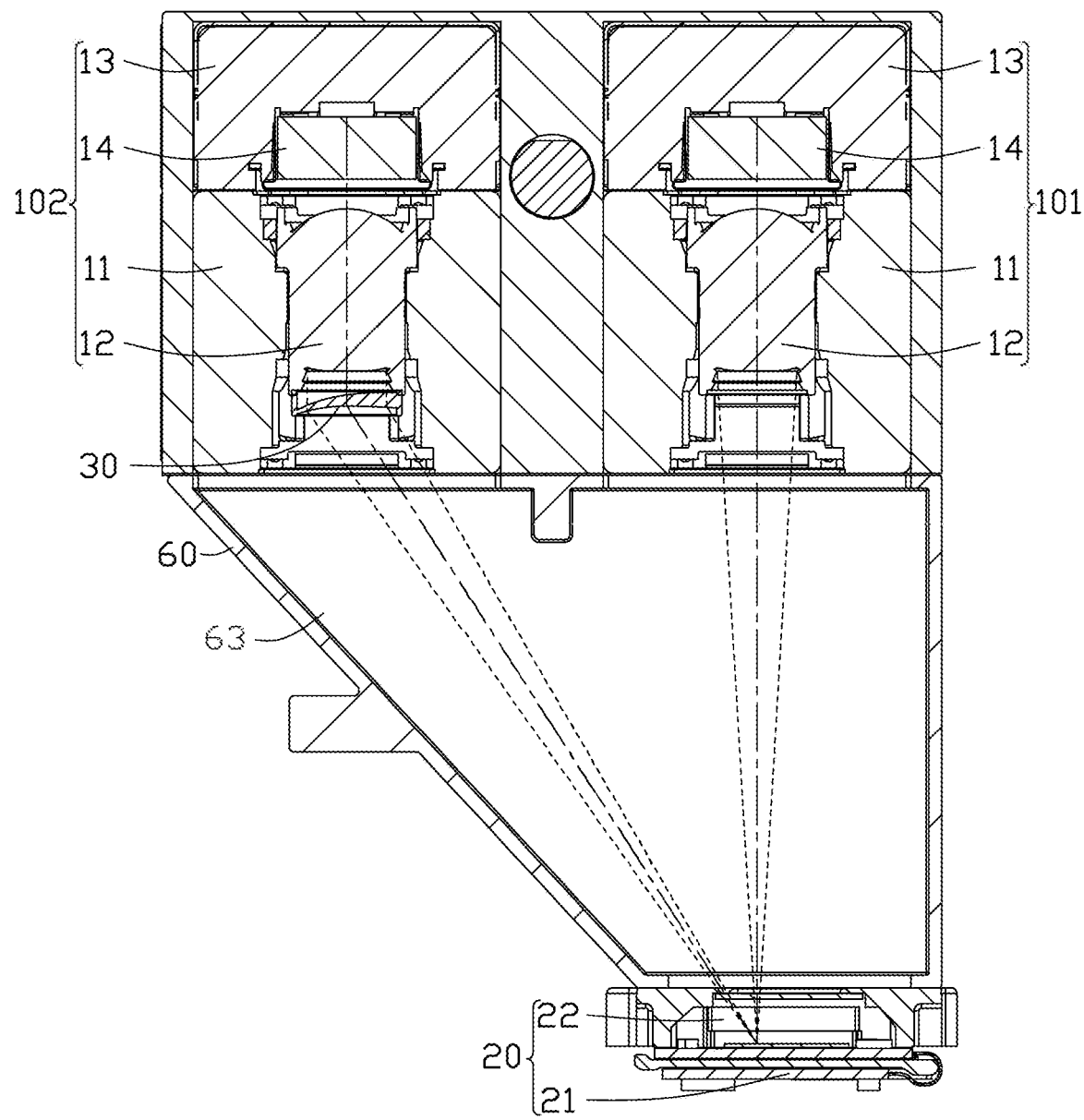
FIG. 6 is a cross section view along line V-V of FIG. 1.

Additionally and/or alternatively, referring to FIGS. 1-2 and FIG. 6, the camera module 100 further comprises a shell 60, the shell 60 has a first opening 61 and a second opening 62 opposite to the first opening 61. The first opening 61 is connecting to the holder 50 at the side near the image side 122 of the lenses 12 of the two lens modules 10, the second opening 62 is connected to the image acquisition module 20, thus the shell 60 defines a cavity 63 for passage of light from the two lens modules 10 to the image acquisition module 20. Therefore, good imaging quality is guaranteed as the space between the two lens modules 10 and the image acquisition module 20 is enclosed to avoid interference by stray light. In addition, the shell 60 helps to improve the structure stability of the camera module 100.

Additionally and/or alternatively, referring to FIG. 1, the image acquisition module 20 includes a printed circuit board (PCB) 21, a sensor chip 22, a connector 23, and an electronic component (not shown). PCB 21 controls the sensor chip 22, the sensor chip 22 converts light from the lens 12 into an electrical signal, the electronic component processes the electrical signal from the sensor chip 22, and the connector 23 connects the camera module 100 to other devices.

Embodiment 2

Figure 7:
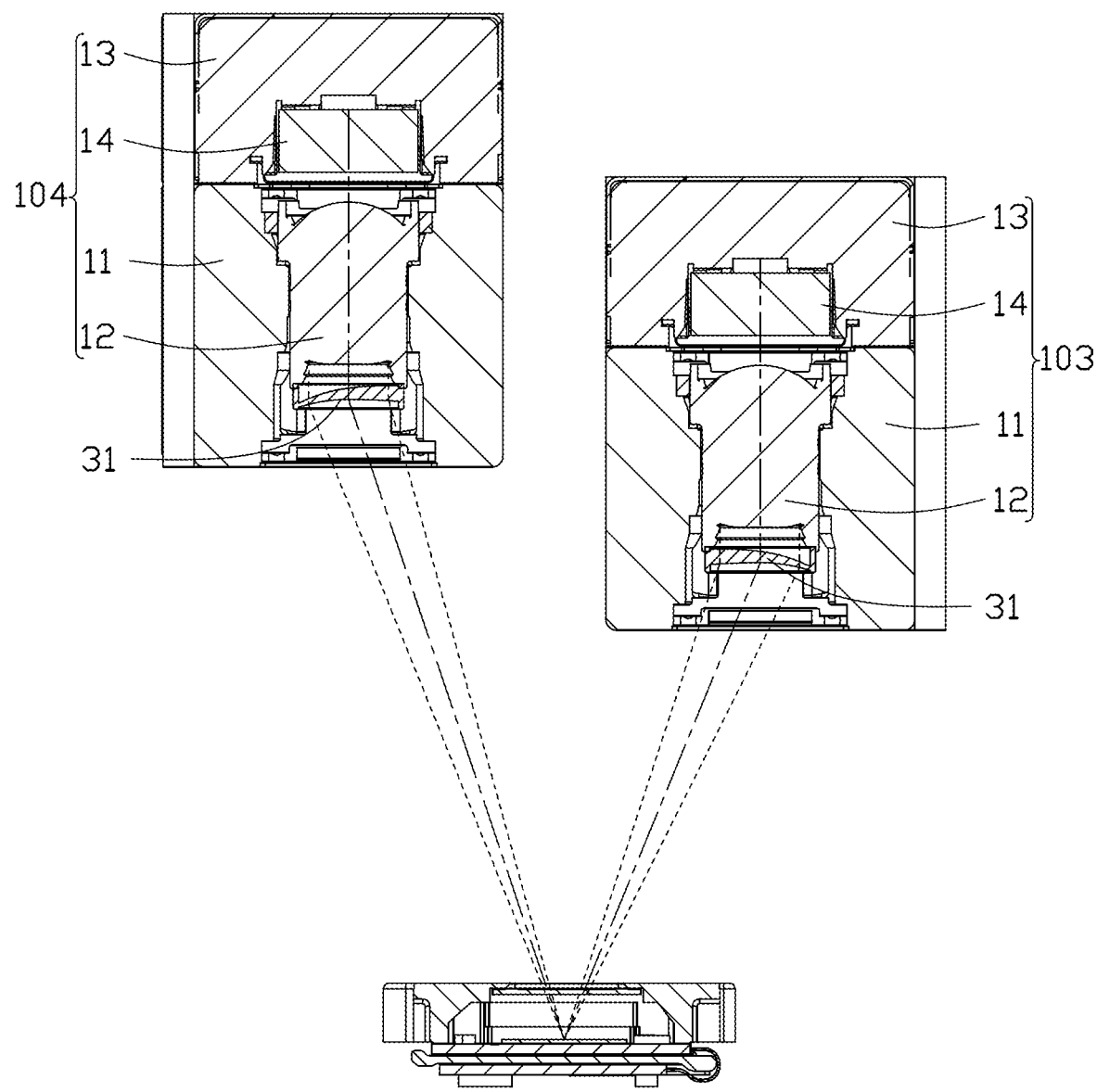
FIG. 7 is a camera module according to a second embodiment of the present disclosure.

Referring to FIG. 7, a camera module 200 is provided, the configuration of the camera module 200 is same with that of the camera module 100, except for that the two lens modules 10 are illustrated as a third lens module 103 and a fourth lens module 104 for convenience of description, wherein neither of the third lens module 103 and the fourth lens module 104 is positioned to align with the image acquisition module 20, the refracting module 30 includes two inflecting components 31 for refracting light from the modules 103 and 104 onto the image acquisition module 20.

Therefore, light going through the third lens module 103 and the fourth lens module 104 is refracted by the respective refracting component 31 of the refracting module 30 to arrive at the image acquisition module 20, then the third lens module 103 shares the image acquisition module 20 with the fourth lens module 104 by switching the lights entering the lens module by the shielding module 40. The configuration of the camera module 200 reduces the number of image acquisition modules 20, saving cost and interior space of the camera module 200.

Additionally and/or alternatively, the refracting component 31 is a freeform lens, the freeform lens refracts the light going through the third/fourth lens module 103/104 onto the image acquisition module 20, thereby the images formed are shifted without changing the optical parameters of the third and fourth lens modules.

Embodiment 3

Figure 8:
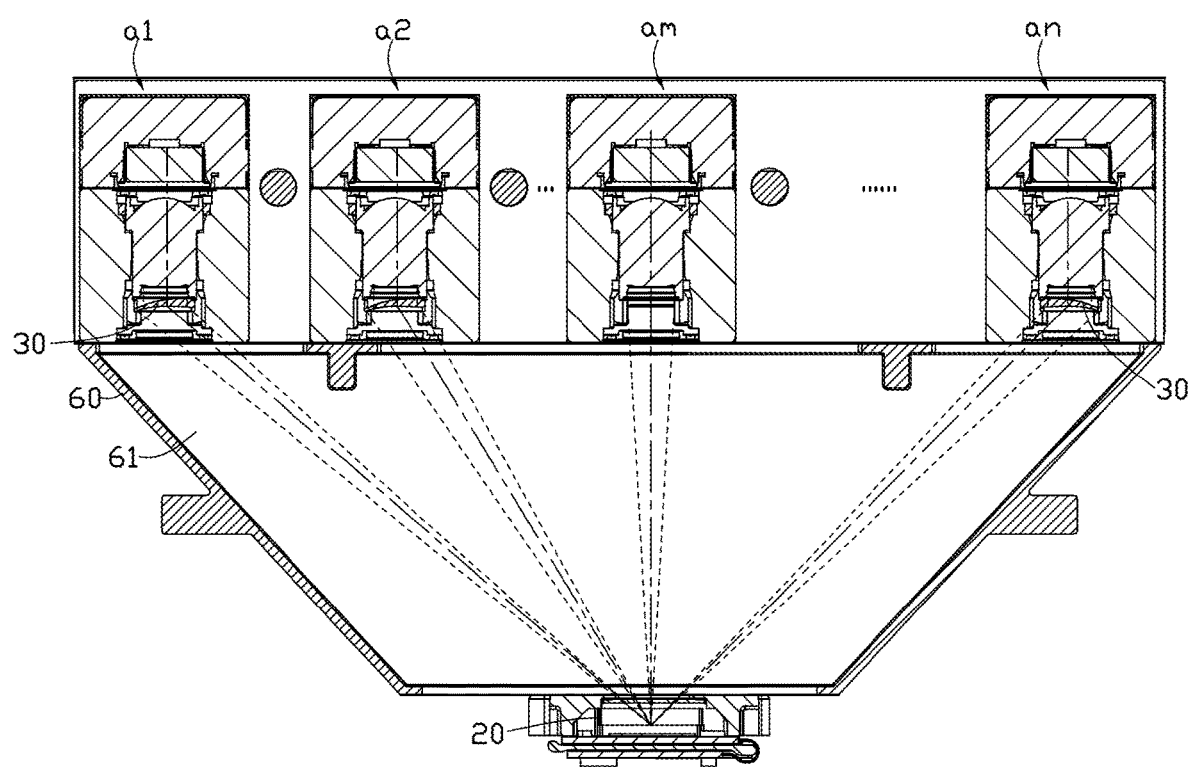
FIG. 8 is a camera module according to a third embodiment of the present disclosure.

Referring to FIG. 8, a camera module 300 is provided, the configuration of the camera module 300 is same with that of the camera module 100, except that there is a series of lens modules 10, an image acquisition module 20, a refracting module 30, and a shielding module 40. The series of lens modules are individually designated as $a_1$, $a_2$, $a_3$, ..., and $a_n$. The lens modules of the series are disposed in a row, wherein one lens modules $a_m$ of the series is positioned to align with the image acquisition module 20, the other lens modules are connected to the refracting module 30 for refracting light to the image acquisition module 20. Specifically, the refracting module 30 includes (n−1) inflecting components 31, one for each of the other lens modules of the series. The shielding module 40 includes (n−1) shielding components 41, the shielding component 41 is arranged between adjacent lens modules for covering either one of the adjacent lens modules, thus allowing entry of light into only one of the lens modules of the series.

Alternatively, in further embodiments, there are no lens modules positioned to align with the image acquisition module 20, and the refracting module 30 includes n inflecting components 31. Each inflecting component 31 is connected to one lens modules for refracting the light to the image acquisition module 20. In such a case, the shielding module 40 includes (n−1) shielding components 41, a shielding component 41 is arranged between each two adjacent lens modules for covering one or other of the adjacent lens modules, thus allowing light to enter only one of the lens modules of the camera module 300.

Therefore, light going through each of the lens module $a_1$-$a_n$ can be refracted by the respective refracting component 31 of the refracting module 30 to arrive at the image acquisition module 20, the shielding module 40 allows only one of the lens modules of the camera module 300 to function, and all of the lens modules $a_1$-$a_n$ can share one image acquisition module 20. The configuration of the camera module 300 reduces the number of image acquisition modules 20, which saves cost and interior space of the camera module 300.

Additionally and/or alternatively, the refracting component 31 may be a freeform lens, the freeform lens refracts the light going through the lens module to the image acquisition module 20, then the images formed are shifted without changing the optical parameters of the lens module.

According to a further embodiment, an electronic device (not shown) is provided, the electronic device is arranged with a camera module 100.

The configuration of the camera module 100 reduces the number of image acquisition modules 20, which saves the cost of the camera module and the space of the electronic device.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A camera module comprising:
    a first lens module and a second lens module disposed adjacent to each other, each of the first lens module and the second lens module comprising a lens for receiving light, the lens defining an object side and an image side opposite to the object side;
    an image acquisition module aligned with the image side of the lens of the first lens module, the image acquisition module converting light transmitted from the lens of the first lens module;
    a refracting module, the refracting module comprising a refracting component, the refracting component being arranged between the image side of the lens of the second lens module, and the image acquisition module refracting light from the lens of the second lens module to the image acquisition module;
    a shielding module, the shielding module guiding light into either the first lens module or the second lens module by covering the lens of the other one of the first lens module and the second lens module.

2. The camera module of claim 1, wherein the refracting component is a freeform lens, the freeform lens refracting light from the lens of the second lens module to the image acquisition module without optical distortion.

3. The camera module of claim 1, wherein each of the first and the second lens modules includes a first driver, the first driver is configured for moving and focusing the respective lens.

4. The camera module of claim 3, wherein each of the first lens module and the second lens module comprises a second driver having a prism therein, the second driver moves the prism for refracting incoming light into the lens;
    wherein the prism comprises a first surface facing external, a second surface facing the object side of the lens, and a third surface configured to reflect incident light to change a path of the incident light to the lens; and
    wherein the shielding module guides light into one of the first lens module and the second lens module by covering the prism of the other one of the first lens module and the second lens module.

5. The camera module of claim 4, further comprising a holder, the first lens module and the second lens module being mounted in the holder; wherein:
    the shielding module comprises a third driver mounted on the holder and a shielding component rotatably connected to the holder via the third driver, the third driver is positioned between the first lens module and the second lens module;
    the shielding component comprises a first shielding portion, a second shielding portion, and a connecting shaft, wherein the first shielding portion and the second shielding portion are located respectively at two ends of the connecting shaft, the connecting shaft is connected to the third driver at a middle part for pivoting the shielding component, the third driver pivots the shielding component to cover the prism of the first lens module by the first shielding portion or the prism of the second lens module by the second shielding portion.

6. The camera module of claim 5, further comprising a shell, the shell defining a first opening and a second opening opposite to the first opening, wherein
the first opening is connected to the holder at a side near the image side of the lenses of the first lens module and the second lens module, the second opening is connected to the image acquisition module, the shell defines a cavity defining a light path from the first lens module to the image acquisition module and a light path from the second lens module to the image acquisition module.

7. The camera module of claim 6, wherein the image acquisition module comprises a printed circuit board, a sensor chip, a connector, and an electronic component, wherein
the printed circuit board is configured for controlling the sensor chip;
the sensor chip is configured for converting incoming light into an electrical signal;
the electronic component is configured for processing the electrical signal from the sensor chip;
the connector is configured for connecting the camera module to other devices.

8. A camera module comprising:
a series of lens modules, each lens module comprises a lens for receiving light, the lens comprises an object side and an image side opposite to the object side;
an image acquisition module arranged after the image sides of the lenses of the series of lens modules for converting the light transmitted from the lens;
a refracting module, the refracting module comprises a series of refracting components, each refracting component being arranged between the image side of one of the series of lens modules and the image acquisition module for refracting the light from the lens to the image acquisition module;
a shielding module, the shielding module guiding light into the lens of one lens module of the series of lens modules by covering the lenses of the rest lens modules.

9. The camera module of claim 8, wherein the refracting component is a freeform lens, the freeform lens refracting light from the respective lens to the image acquisition module without optical distortion.

10. The camera module of claim 8, wherein the image acquisition module being aligned with one of the series of lens modules, the refracting component being configured for that one of the series of lens modules being removed.

11. The camera module of claim 8, wherein each of the series of lens modules includes a first driver, the first driver is configured for focusing the respective lens;
each of the series of lens modules comprises a second driver having a prism received in the second driver, the second driver moves the prism for refracting incoming light into the lens;
wherein each prism comprises a first surface facing external, a second surface facing the object side of the lens, and a third surface configured to reflect incident light to change a path of the incident light to the lens; and
wherein the shielding module guides light into the prism of one of the series of lens modules by covering the first surface of the prisms of the rest of the series of lens modules.

12. The camera module of claim 11, further comprising a holder, the series of lens modules being mounted in the holder and disposed in a row; wherein:
the shielding module comprises a series of third drivers and shielding components, each shielding component being mounted on the holder near the prism of one of the series of lens module, each of the third driver moves one of the shielding components to cover the prism of the one of the series of lens modules.

13. The camera module of claim 12, further comprising a shell, the shell defining a first opening and a second opening opposite to the first opening, wherein;
the first opening is connected to the holder at a side near the image side of the lenses of the lens modules, the second opening is connected to the image acquisition module, the shell defines a cavity defining a light path from each of the lens modules to the image acquisition module.

14. The camera module of claim 12, wherein the image acquisition module comprises a printed circuit board, a sensor chip, a connector, and an electronic component, wherein
the printed circuit board is configured for controlling the sensor chip;
the sensor chip is configured for converting the light transmitted from the lens into an electrical signal;
the electronic component is configured for processing the electrical signal from the sensor chip;
the connector is configured for connecting the camera module to other devices.

15. An electronic device comprising the camera module of claim 1.

* * * * *